(12) United States Patent
Bruno et al.

(10) Patent No.: US 12,492,831 B2
(45) Date of Patent: Dec. 9, 2025

(54) POCKETED AIR FILTERS AND METHOD FOR DETERMINING PERFORMANCE OF AN AIR FILTER IN HEATING, VENTILATION, AND AIR CONDITIONING (HVAC) SYSTEMS

(71) Applicant: ECOCEPTIONAL PRODUCTS INC., York (CA)

(72) Inventors: Giuseppe Bruno, York (CA); Francesco Bruno, York (CA); Vittorio Bruno, York (CA); Jonathan Loudon, Toronto (CA)

(73) Assignee: ECOCEPTIONAL PRODUCTS INC., York (CA)

( * ) Notice: Subject to any disclaimer, the term of this patent is extended or adjusted under 35 U.S.C. 154(b) by 537 days.

(21) Appl. No.: 17/884,129

(22) Filed: Aug. 9, 2022

(65) Prior Publication Data

US 2023/0040666 A1 Feb. 9, 2023

Related U.S. Application Data

(60) Provisional application No. 63/230,923, filed on Aug. 9, 2021.

(51) Int. Cl.
| | |
|---|---|
| *F24F 8/10* | (2021.01) |
| *B01D 46/00* | (2022.01) |
| *B01D 46/56* | (2022.01) |
| *B01D 46/62* | (2022.01) |
| *F24F 8/108* | (2021.01) |

(Continued)

(52) U.S. Cl.
CPC .......... *F24F 8/108* (2021.01); *B01D 46/0005* (2013.01); *B01D 46/56* (2022.01); *B01D 46/62* (2022.01); *G05B 15/02* (2013.01); *G06Q 30/0281* (2013.01)

(58) Field of Classification Search
CPC .... B01D 46/00; B01D 46/0005; B01D 46/10; B01D 46/56; B01D 46/62
See application file for complete search history.

(56) References Cited

U.S. PATENT DOCUMENTS

| | | | |
|---|---|---|---|
| 8,021,455 B2* | 9/2011 | Adamek | F02M 35/024 55/497 |
| 2008/0000827 A1* | 1/2008 | Bruss | B01D 63/0822 210/489 |
| 2017/0340998 A1* | 11/2017 | Schneider | B01J 20/3253 |

* cited by examiner

*Primary Examiner* — Robert A Hopkins
(74) *Attorney, Agent, or Firm* — Bhole IP Law; Marc Lampert; Anil Bhole

(57) ABSTRACT

There is provided an air filter for use in a heating, ventilation, and air conditioning (HVAC) system, the air filter including: a front portion comprising a molded filtering material, the molded filtering material defining a plurality of pockets arranged over a front face of the front portion; and a rear portion joined to the front portion, the rear portion defining a plurality of holes therethrough. In another aspect, there is provided a method for determining performance of an air filter in a heating, ventilation, and air conditioning (HVAC) system, the method including: receiving a first temperature reading from a primary sensor measuring the temperature of return air in the HVAC system; receiving a second temperature reading from a secondary sensor measuring the temperature of supply air in the HVAC system; determining a temperature differential between the first temperature and the second temperature; outputting an indication of poor performance of the air filter where the temperature difference is greater than a predetermined value.

7 Claims, 18 Drawing Sheets

(51) Int. Cl.
*G05B 15/02* (2006.01)
*G06Q 30/02* (2023.01)

__POCKETED AIR FILTERS AND METHOD FOR DETERMINING PERFORMANCE OF AN AIR FILTER IN HEATING, VENTILATION, AND AIR CONDITIONING (HVAC) SYSTEMS__

TECHNICAL FIELD

The present invention relates to air filters and methods for determining performance of an air filter in heating, ventilation, and air conditioning (HVAC); and more particularly, to pocketed HVAC air filters.

BACKGROUND

As illustrated in the example of FIG. 1, heating, ventilation, and air conditioning (HVAC) system 50 generally include an air filter 52. In this case, the filter 52 slots in a filter-housing slot 54. As exemplified in FIG. 2, the air filter 52 removes particles, dust, pet dander, bacteria, smoke, contaminants, vapors and/or gases from the air prior to performing heating, ventilation and/or air conditioning on such air. Not only does this filtration improve the air quality within a building (for example, a dwelling, home, apartment, office, or the like), but it also protects the HVAC system from damage. For example, the filter protects a blower fan in the system from all the dust, hair, and other gunk that is pulled in from the return duct.

Problems occur when the air filter 52 becomes clogged, or when the filter is too dense, because the HVAC system 50 has to work harder to pull air through and can overheat the furnace. Coils start to freeze up and the heat exchanger trips. In this way, manufactures of HVAC systems generally instruct consumers not to get the highest rating but get the best rating for their particular HVAC system. While some filters have high filtration, they can be too fine/dense to let sufficient air through once they get moderately clogged with particulates; causing harm to the HVAC system.

SUMMARY

In an aspect, there is provided an air filter for use in a heating, ventilation, and air conditioning (HVAC) system, the air filter comprising: a front portion comprising a molded filtering material, the molded filtering material defining a plurality of pockets arranged over a front face of the front portion; and a rear portion joined to the front portion, the rear portion defining a plurality of holes therethrough.

In a particular case, at least a portion of the plurality of pockets have sides that define a circular or polygonal shape.

In another case, the plurality of pockets are arranged in a grid pattern of offset rows over the front face of the front portion.

In yet another case, each of the plurality of pockets define a plurality of holes therethrough that are sized to be larger than pores in the filtering material and smaller than the plurality of holes in the rear portion.

In yet another case, the plurality of holes are positioned on a bottom of each of the plurality of pockets.

In yet another case, each of the plurality of pockets is at least partially filled with extra filter material.

In yet another case, the extra filter material comprises activated-carbon or charcoal.

In yet another case, the air filter further comprising secondary filters sandwiched between the front portion and the rear portion.

In yet another case, the air filter further comprising a compressible gasket positioned on outer edges of the air filter and dimensioned to form a seal with a filter housing in the HVAC system.

In another aspect, there is provided an HVAC system comprising an air filter comprising: a front portion comprising a molded filtering material, the molded filtering material defining a plurality of pockets arranged over a front face of the front portion; and a rear portion joined to the front portion, the rear portion defining a plurality of holes therethrough.

In yet another aspect, there is provided a method for determining performance of an air filter in a heating, ventilation, and air conditioning (HVAC) system, the method comprising: receiving a first temperature reading from a primary sensor measuring the temperature of return air in the HVAC system; receiving a second temperature reading from a secondary sensor measuring the temperature of supply air in the HVAC system; determining a temperature differential between the first temperature and the second temperature; outputting an indication of poor performance of the air filter where the temperature difference is greater than a predetermined value.

In a particular case, the method further comprising instructing the HVAC system to cease operation when the temperature difference is greater than the predetermined value.

In yet another case, the primary sensor is located on an air register of the return side of the HVAC system the secondary sensor is located on an air register of the supply side of the HVAC system.

In yet another case, the primary sensor is located on the air filter.

In yet another case of the method, the air filter comprising: a front portion comprising a molded filtering material, the molded filtering material defining a plurality of pockets arranged over a front face of the front portion; and a rear portion joined to the front portion, the rear portion defining a plurality of holes therethrough.

In another aspect, there is provided a controller for determining performance of an air filter in a heating, ventilation, and air conditioning (HVAC) system, the controller configured to receive a first temperature reading from a primary sensor measuring the temperature of return air in the HVAC system; receive a second temperature reading from a secondary sensor measuring the temperature of supply air in the HVAC system; determine a temperature differential between the first temperature and the second temperature; and output an indication of poor performance of the air filter where the temperature difference is greater than a predetermined value.

In another case, the controller instructs a light or a digital display to output the indication of poor performance.

In yet another case, the controller communicates with the HVAC system or another electronic device to provide the indication of poor performance.

In yet another case of the method, the method further comprising outputting an indication that the HVAC system is not functioning where the temperature difference is greater than a predetermined value and the date of installation for the air filter to a present date is within a predetermined time period.

In yet another case of the method, the method further comprising determining an estimation of blockage of the filter using a correlation to the temperature difference, and outputting the determined estimation of blockage.

In yet another case of the method, the method further comprising communicating with an air filter retailer to order a replacement air filter when the temperature difference is greater than a predetermined value.

BRIEF DESCRIPTION OF THE DRAWINGS

The features of the invention will become more apparent in the following detailed description in which reference is made to the appended drawings wherein.

Figure 1:
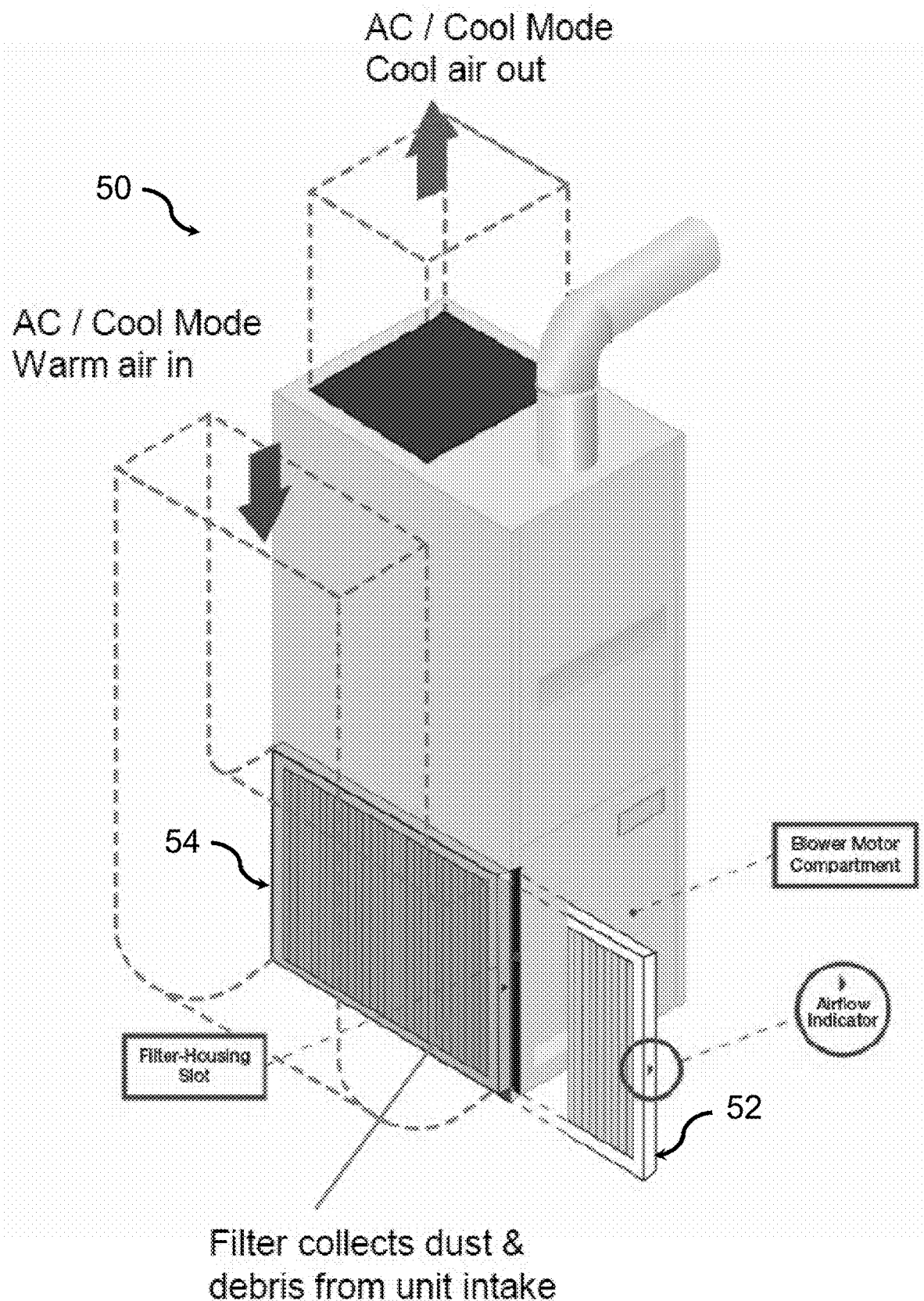
FIG. 1 is a perspective view of a heating, ventilation, and air conditioning (HVAC) system.
Figure 2:
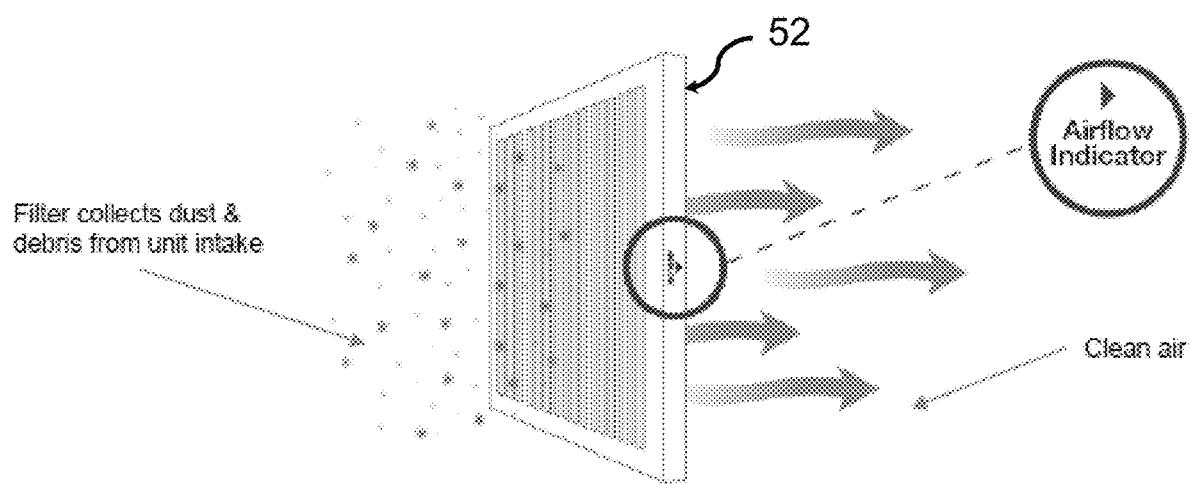
FIG. 2 is a perspective diagram of an air filter.

The present description and figures are to be considered an exemplification of the principles of the disclosure and is not intended to limit the disclosure to the details of construction and the arrangements of components set forth in the following description or illustrated in the drawings. It is to be understood that other embodiments may be utilized and structural changes may be made without departing from the scope of the present invention.

DETAILED DESCRIPTION

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

The present invention relates to air filters for heating, ventilation, and air conditioning (HVAC); and more particularly, to pocketed HVAC air filters.

Figure 3D:
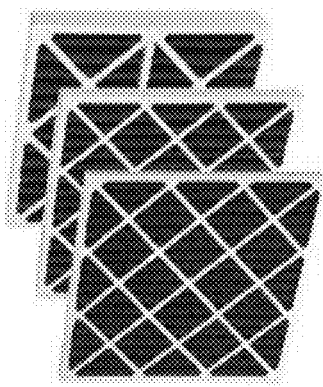
FIG. 3D is an illustration of an activated carbon air filter.
Figure 3C:
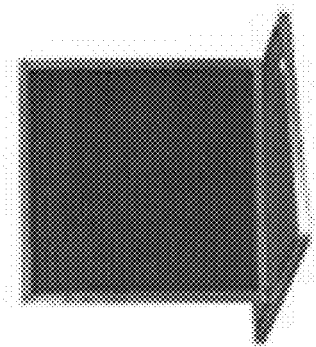
FIG. 3C is an illustration of a permanent reusable air filter.
Figure 3B:
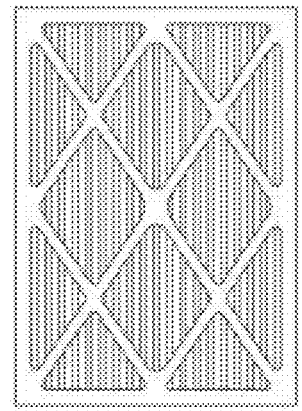
FIG. 3B is an illustration of a pleated air filter.
Figure 3A:
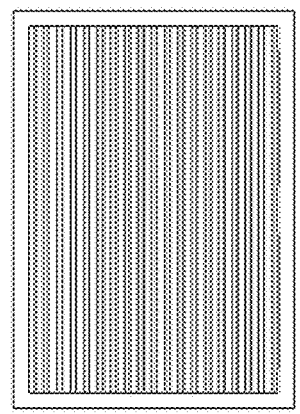
FIG. 3A is an illustration of a disposable fiberglass air filter.
Figure 4:
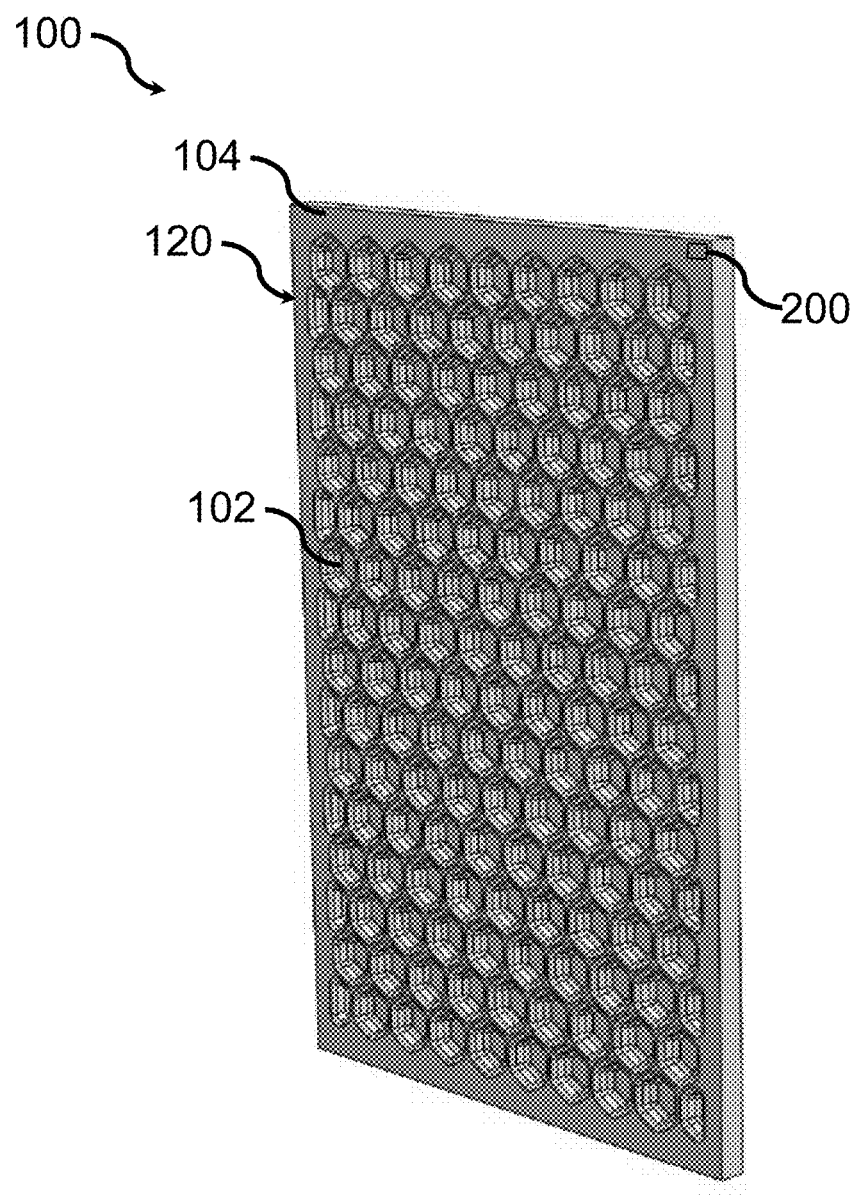
FIG. 4 is a perspective view of a front portion of an air filter in accordance with an embodiment.
Figure 5:
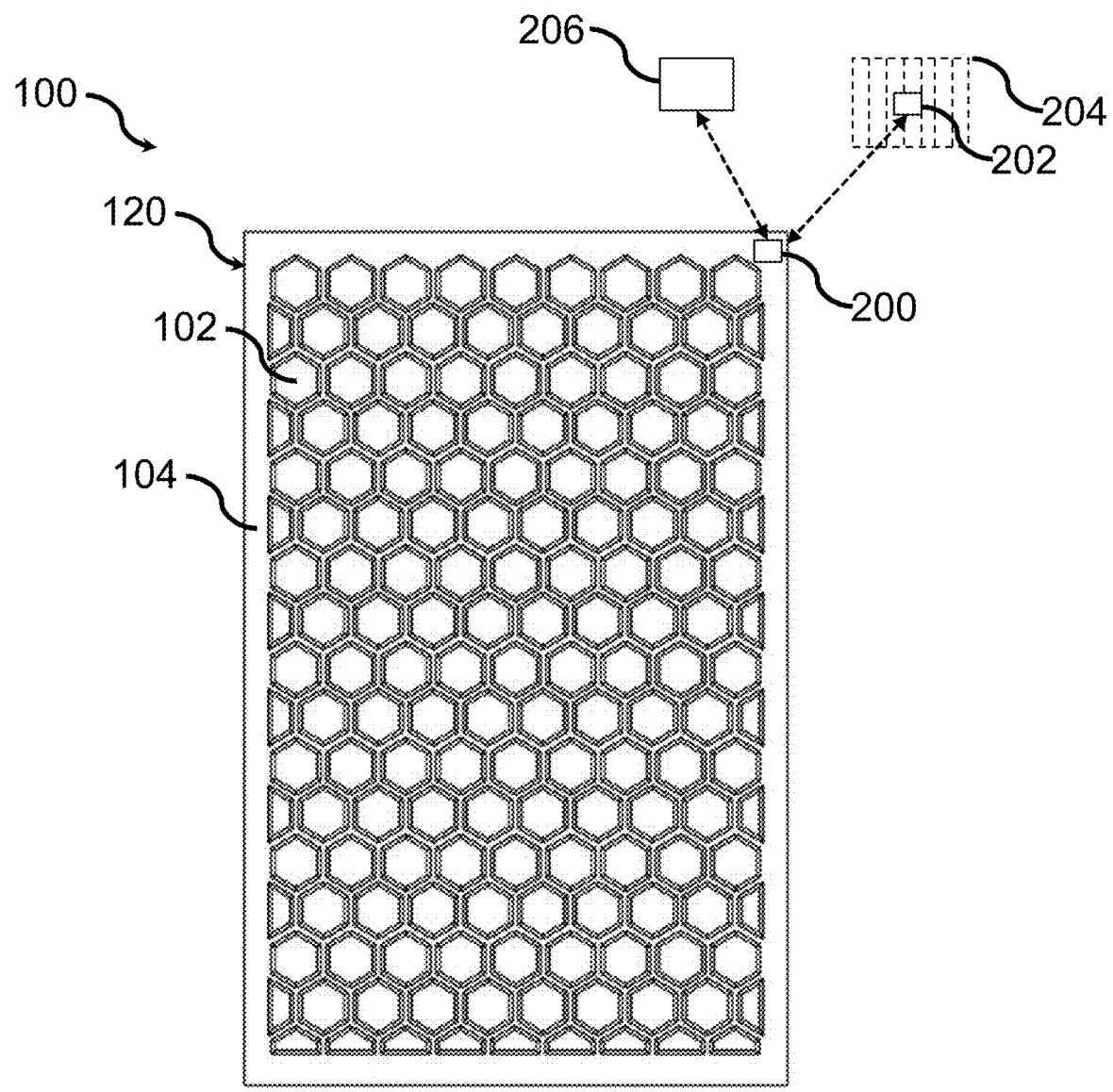
FIG. 5 is a front view of the front portion of the air filter in accordance with an embodiment.

FIGS. 3A to 3D illustrate three common types of air filters. FIG. 3A illustrates an example of a disposable fiberglass air filter. These types of filters are relatively inexpensive. They have an almost spider web appearance but are generally flimsy and have relatively low filtration ratings. Due to their inferior quality, disposable fiberglass filters have to be checked and replaced frequently. FIG. 3B illustrates an example of a pleated air filter. These are the most common type of filter and are constructed out of paper and polyester. Particulate matter will generally slide throughout each of the pleats, eventually causing each pleat to become clogged when enough matter has accumulated. Additionally, pleated air filters as the captured particles slide down the channels, they generally with accumulate at the bottom of the small channels which may not have capacity to hold all particles; in this way, the captured particles can overflow and spills over into the ductwork of the HVAC system. FIG. 3C illustrates an example of a permanent reusable air filters (also referred to as washable filter) which are constructed with either a solid aluminum or plastic frame and can be vacuumed off and cleaned with water. These filters require very frequent cleaning in comparison to the change schedule of disposable filters. FIG. 3D illustrates an example of an activated carbon air filter. These filters use activated carbon, which has a permeable structure that allows it to have an excessively huge surface zone associated with its weight. This surface zone allows it to trap little toxins inside its pores. These types of filters are very expensive and only suitable for certain applications.

As the air filters get used, they get filled up with dust and debris. For example, for pleated filters, as more debris gets into the pleats and onto the surface, the filter starts restricting more and more airflow. After a certain point, air is struggling to get through and the filter is over burdening the fan of the HVAC system. In some cases, HVAC systems may have a high limit switch to shut down after being burdened beyond a given point.

Advantageously, as described herein, a pocketed air filter 100 of the present embodiments overcomes at least some of the problems and challenges of the prior art filters.

Figure 9:
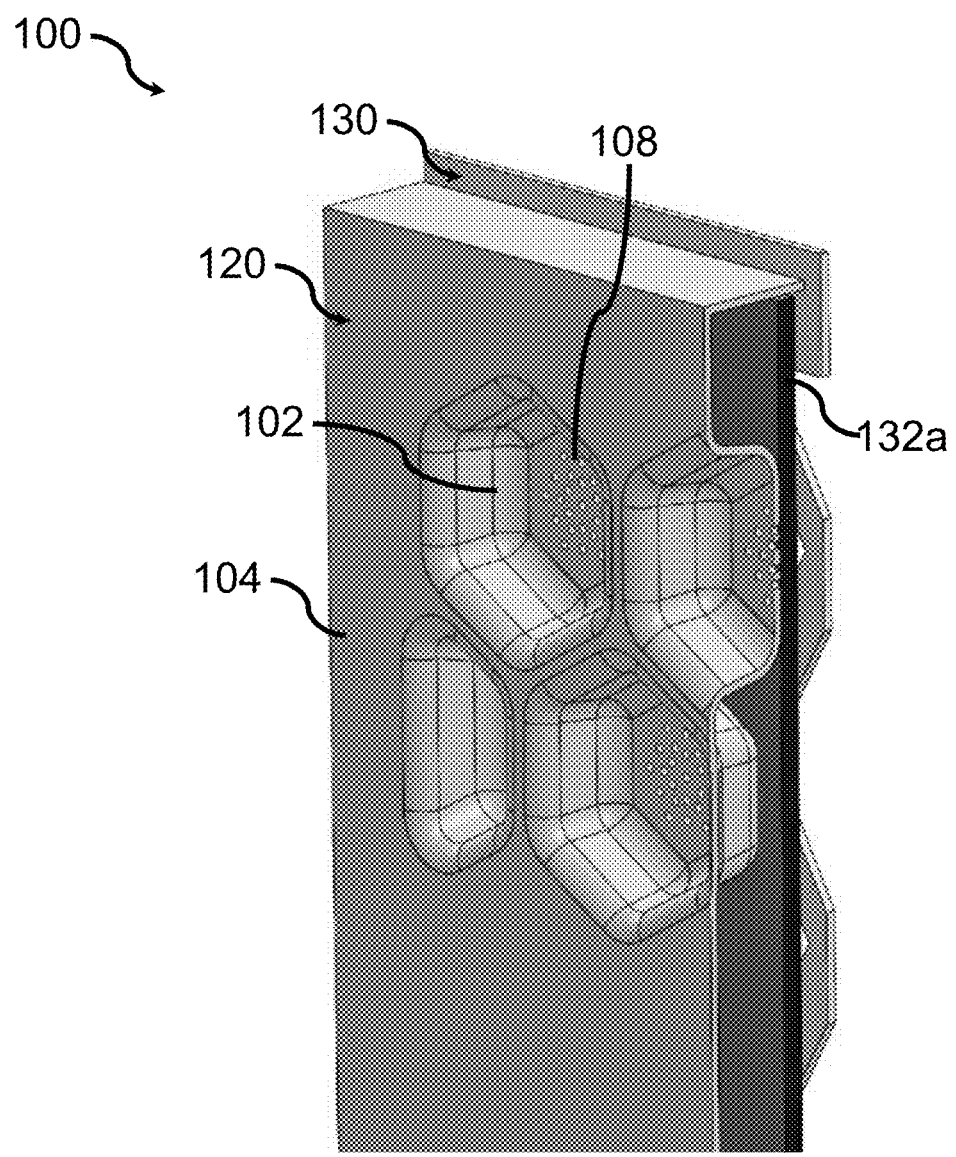
FIG. 9 is a partial-cutaway sectional perspective view of the air filter in accordance with an embodiment.
Figure 10:
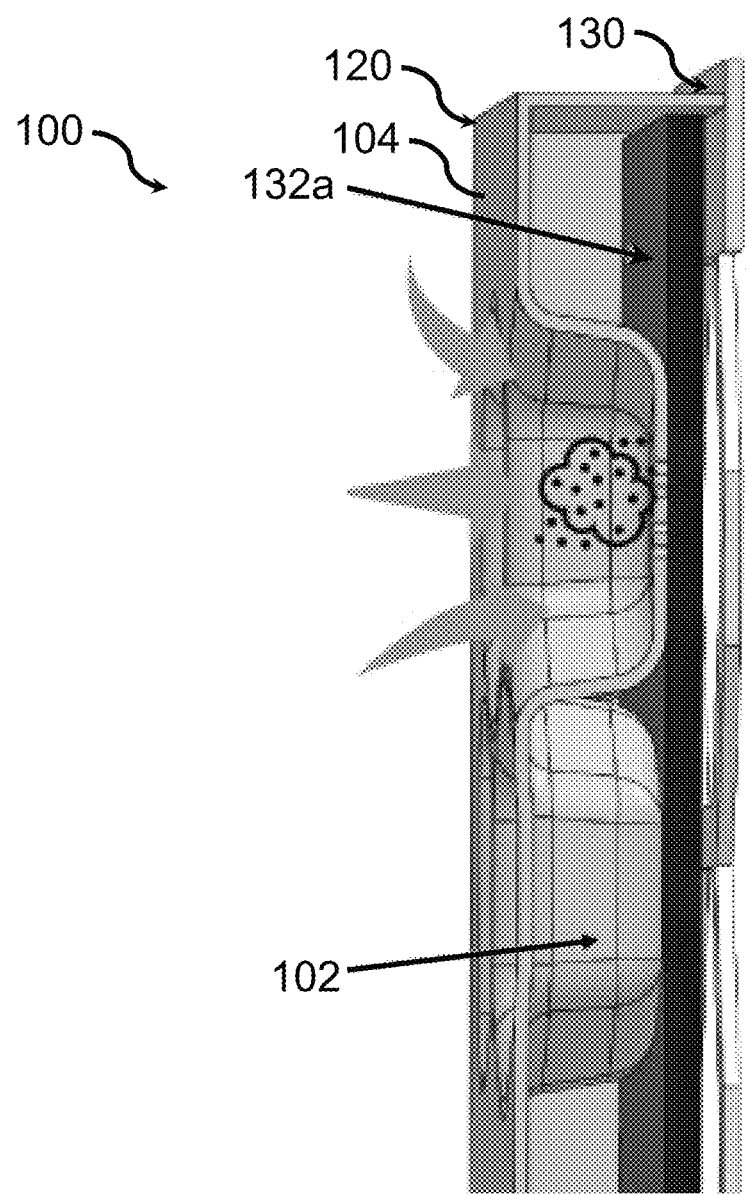
FIG. 10 is a partial-cutaway sectional side view of the air filter in accordance with an embodiment.
Figure 11:
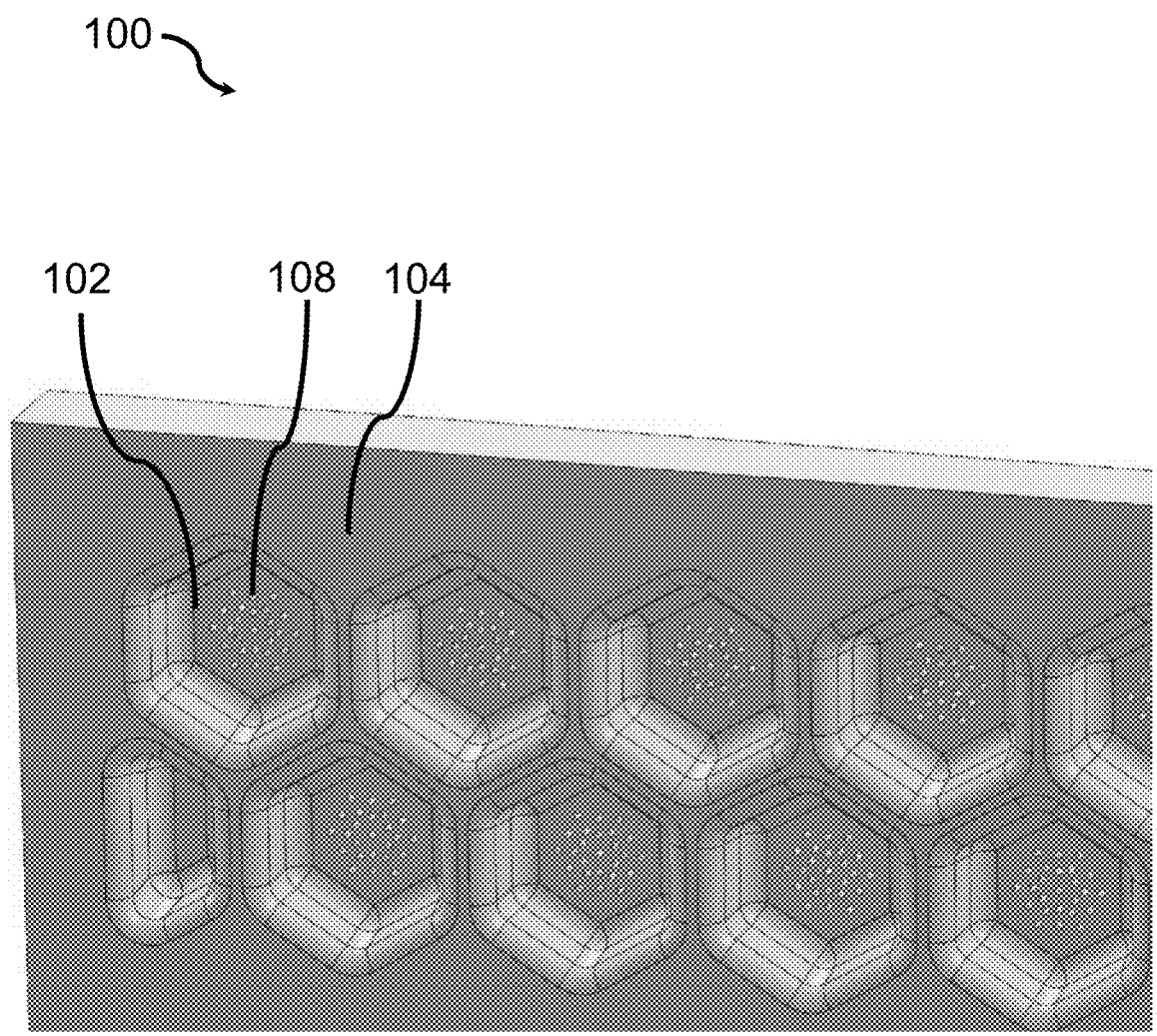
FIG. 11 is a sectional perspective view of the front portion of the air filter in accordance with an embodiment.

FIGS. 4 to 11 illustrate a front portion 120 of the pocketed air filter 100 according to an embodiment. As illustrated in the perspective view of FIG. 4 and the front view of FIG. 5, the front portion 120 includes a border 104 surrounding the outside of the filter 100 and a number of 'pockets' 102 arranged across the face of the filter 100. In the illustrated case, the pockets 102 are arranged in a grid pattern of offset rows; however, any suitable pattern can be used. Additionally, in this illustrated case, the pockets 102 have a hexagonal shape; however, any suitable shape that provides structural integrity can be used, such as other polygons (e.g., octagons or diamonds), circles, or the like. In the illustrated case, the shape of pockets near the border 104 may have cut-off portions of the hexagonal shape so as to not overlap with the border 104. In some cases, as illustrated in FIG. 11, the pocket shape can have rounded edges; however, in further cases, the pocket can have sharp or perpendicular edges.

Figure 6:
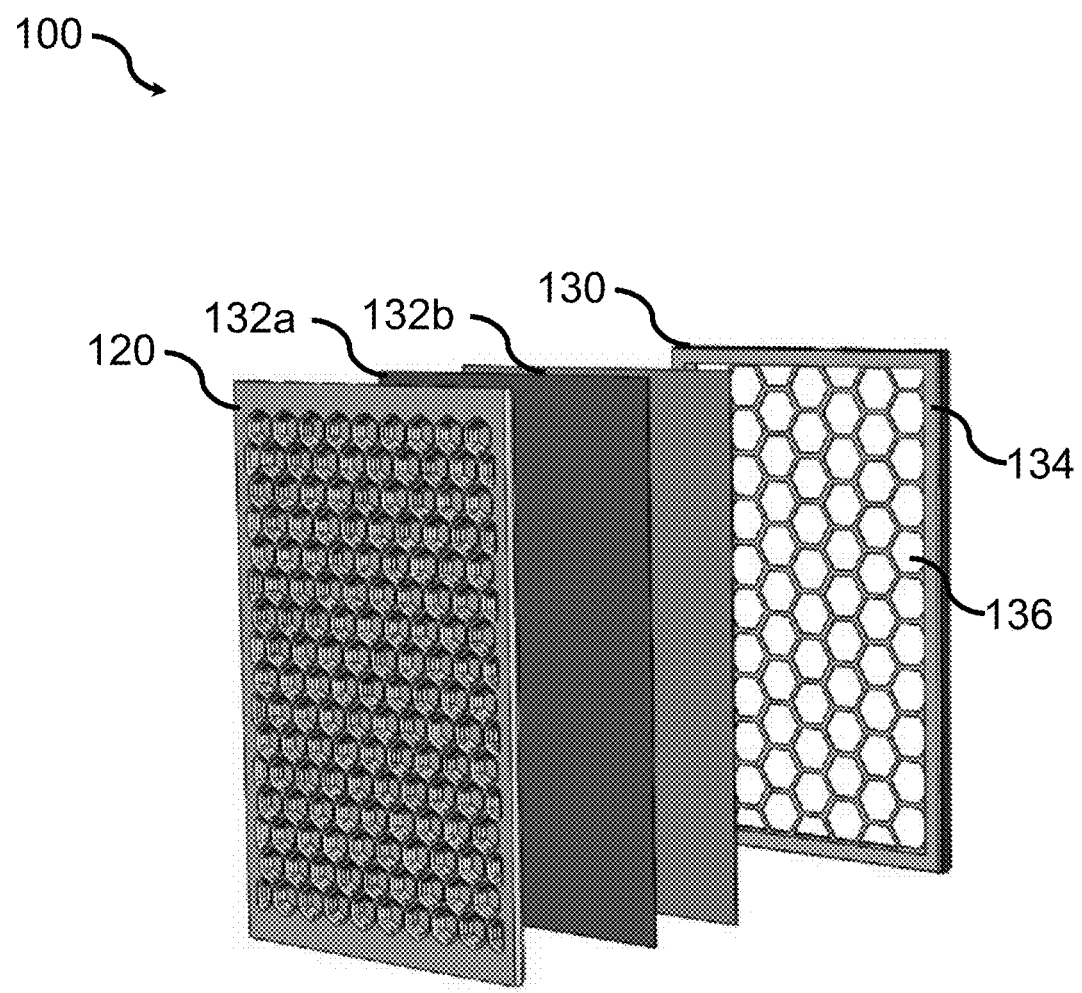
FIG. 6 is an exploded perspective view of the air filter in accordance with an embodiment.
Figure 7:
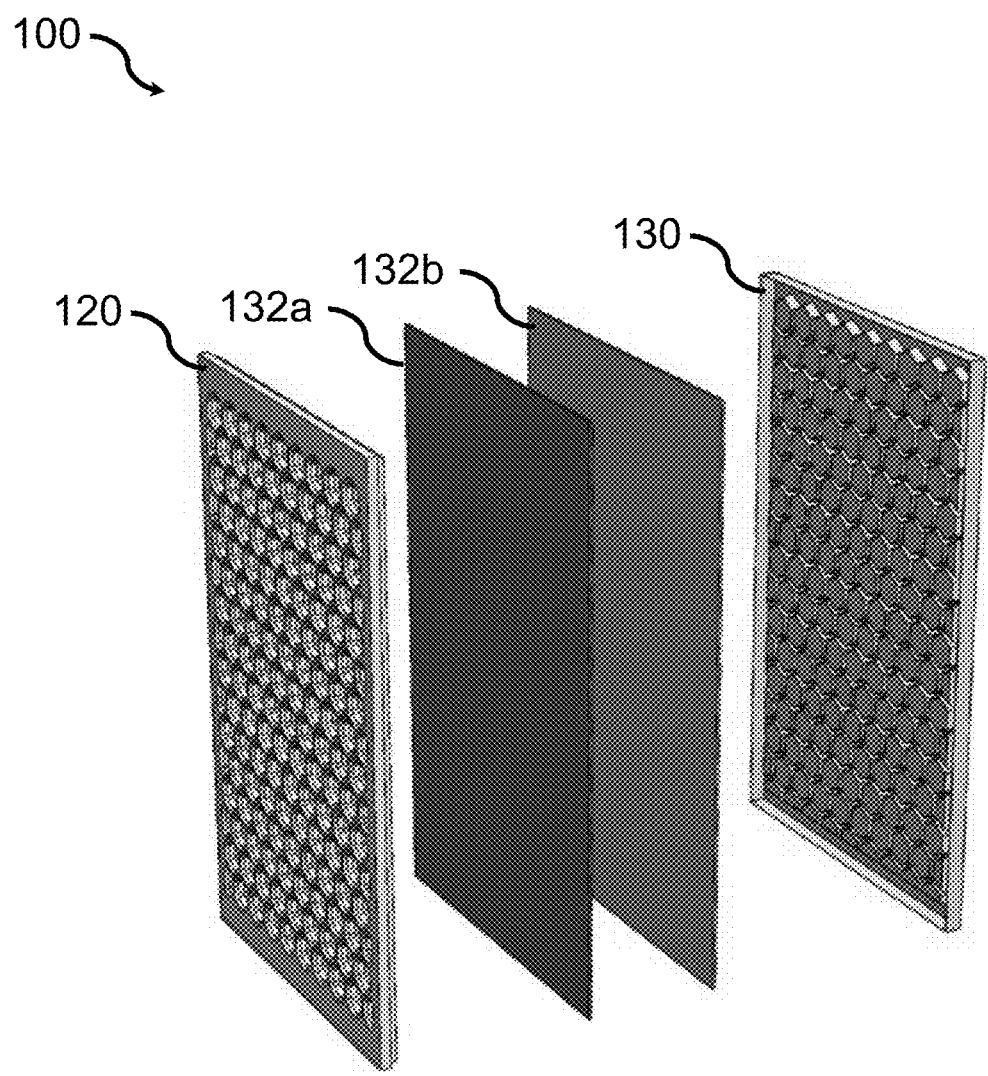
FIG. 7 is an exploded perspective view of the air filter in accordance with an embodiment.

FIGS. 6 and 7 illustrate various layers of the pocketed air filter 100. In this embodiment, the pocketed air filter 100 includes the front portion 120, a rear portion 130, and secondary filters 132a and 132b located between the front portion 120 and the rear portion 130. The rear portion comprises a frame 134 and an interior structure defining a plurality of hollow rear holes 136. The rear portion 130 should permit greater air flow than the other layers of the air filter 100 by having sufficiently large rear holes 136; such as at least bigger than flowthrough holes the pockets 102. However, the interior structure of the rear portion 130 should have sufficient strength to prevent the secondary filters 132a and 132b from deflecting into the HVAC system due to blower fan pull pressure.

The embodiment of FIGS. 6 and 7 illustrate two secondary filters 132a and 132b sandwiched in between the front portion 120 and the rear portion 130; however, any suitable number of filter materials can be used, including no filter material. The secondary filters 132a and 132b can be made of any suitable material, for example, polypropylene, charcoal/activated-carbon, natural fibres, fiberglass, paper, cotton, polyurethane foam, polyester impingement, or the like.

Figure 8:
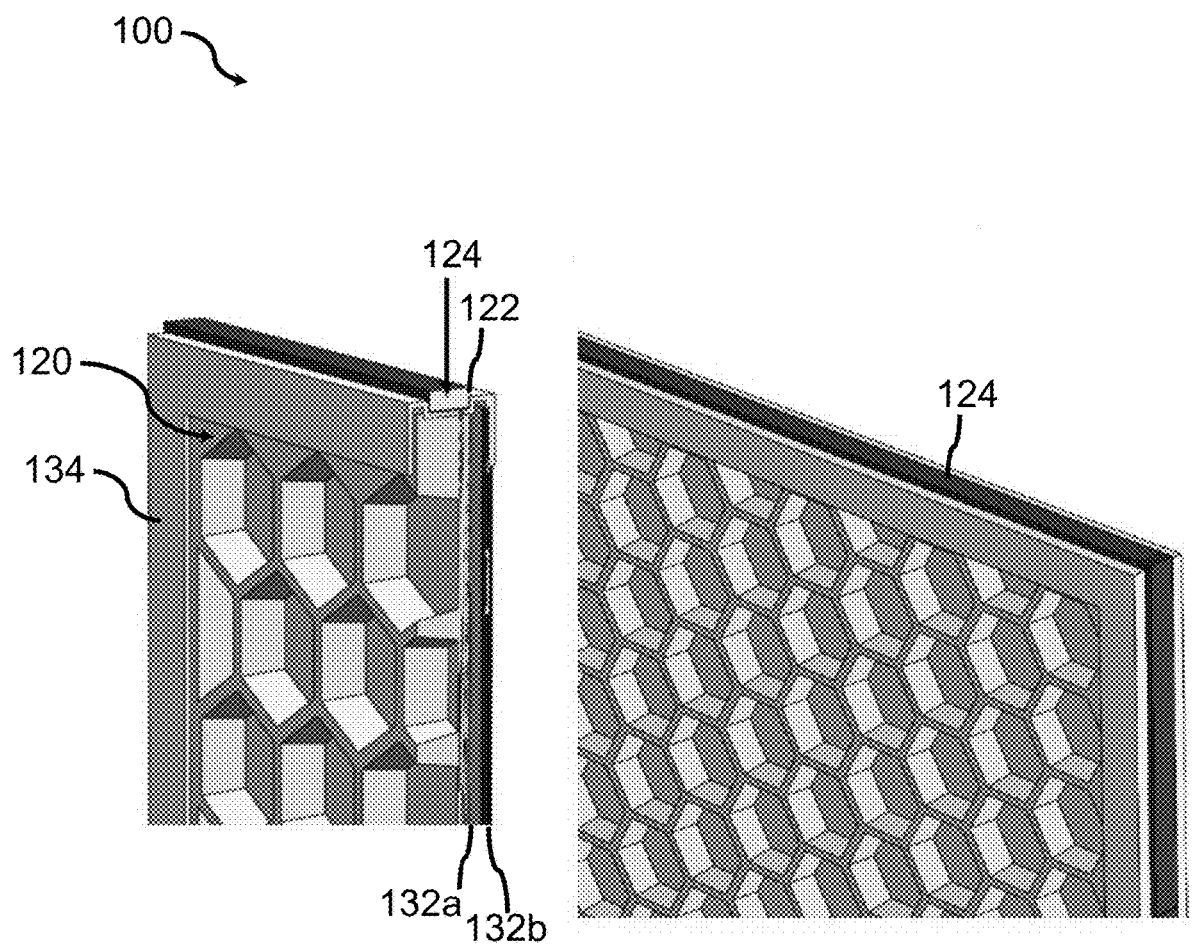
FIG. 8 are sectional perspective views of the air filter in accordance with an embodiment.

As illustrated in FIG. 8, in some cases, the frame 134 is sized to be slightly larger than the border 104 such that the front portion 120 can be placed inside the frame 134, having the secondary filters 132a and 132b sandwiched between the front portion 120 and the rear portion 130. In some cases, the air filter 100 can include additional measures or structures to have the front portion 120 retained inside the frame 134 of the back portion 130; for example, glue, tabs, or the like. In further cases, as illustrated in FIGS. 9 and 10, the border 104 of the front portion 120 can be affixed to the rear portion 130, such as with glue, with the secondary filter 132a in between.

As illustrated in FIG. 8, in an embodiment, the frame 134 of the rear portion 130 can define a slot profile 122 around the outside edge on all four sides of the rear portion 130. The slot 122 can receive a gasket 124 therein. The gasket 124 can be retained using any suitable approach, such as glue or two-sided tape. The gasket 124 can be made of any suitable sealing and compressible material, such as polyurethane foam. The gasket 124 can be used to retain and provide a measure of sealing when the air filter 120 is placed in the filter-housing slot 54. In some cases, the frame 134 can include a recessed pull handle or a tab for easier removal.

The front portion 120, at least the structure of pockets 102, is comprised of filter material; for example, by thermoforming or injection molding micro-filtering material into the structure of pockets 102. The filter material can be comprised of any suitable filtering material; for example, molded natural fibres such as hemp or flax, or synthetic materials such as fiberglass. Advantageously, this provides the ability for the pockets 102, and the structure of the front portion 120 between the pockets 102, to act as a filtering medium for air passing through the filter while also providing the benefits of the pocket shaping. As illustrated in the diagram of FIG. 10, the pockets 102 act to capture and retain larger particles and debris; in contrast to pleated air filters where the captured particles slide down the channels. Additionally, retaining the captured particles in the pockets 102 allows air the flow through and be filtered by the other surface areas of the front portion 120 (such as the walls of the pockets 102 and the structure between the pockets 102). Advantageously, the air filter 100 captures harmful bacteria, viruses, and other matter, then holds and neutralizes this material in the pockets 102. In some cases, after the air passes through the front portion 120, the secondary filters 132a and 132b can be used to capture smaller particles than the filter material of the front portion 120; such as capturing bacteria on a nano-scale.

In some cases, as illustrated in FIGS. 9 and 11, the bottom of the pocket can define a plurality of holes 108 therethrough that are sized to be larger than the pores in the filtering material of the front portion 120. The micro-sized holes 108 allow the air filter 100 to urge more air to flow into the centre of the pocket 102 to capture more particulates in the pocket 102. The plurality of holes 108 can have any suitable arrangement and shape, and in further cases, may also be located on the walls of the pockets 102.

Figure 12:
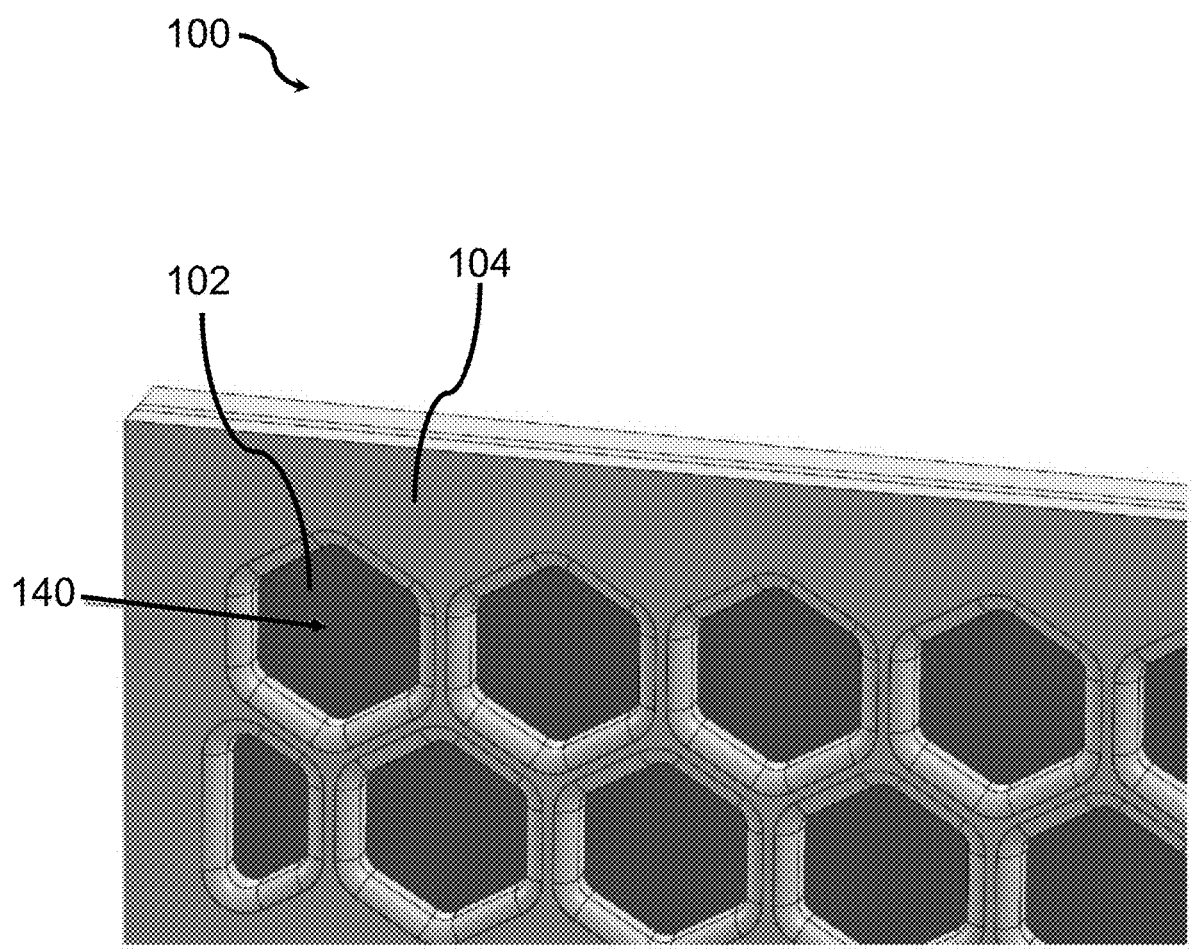
FIG. 12 is a sectional perspective view of the front portion of the air filter in accordance with an embodiment.

In a further embodiment, as illustrated in FIG. 12, the pockets 102 may be at least partially filled with extra filter material 140. Such extra filter material can include, for example, activated-carbon or charcoal. In some cases, the extra filter material 140 can be used instead of the secondary filters 132 and can be used to provide extra filtering capabilities.

Generally, conventional air filters have no means to sufficiently hold on to captured material; so when the air filter is pulled out of the filter housing slot 54, the dirt has a non-trivial likelihood of falling off into the housing slot 54, where it will eventually end up in the HVAC system 50. Advantageously, using the pocketed air filter 100, the captured material is retained inside pockets 102 and substantially prevented from falling into the housing slot 54 during removal.

Generally, conventional air filters do not have a reliable way to determine when the filter is clogging, nor do conventional HVAC systems have a mechanism to determine the condition of the air filters. In a particular approach, a device can be affixed to the air filter to locally sense debris, and thus, be used to extrapolate the amount of debris hitting the air filter. However, this only provides a very rough approximation of the debris striking the air filter, and does not provide information on the performance of the air filter.

The present inventors determined, through experimentation, that filter effectiveness is related to the temperature load and performance of the HVAC system. As the air filter gets clogged, the HVAC system has to run longer to effectively pull the desired temperature of air through the system into the rooms of the building it services. Thus, monitoring for temperature difference, as described herein, provides a determination of the condition and performance of the air filter; rather than mere rough approximations.

Figure 14:
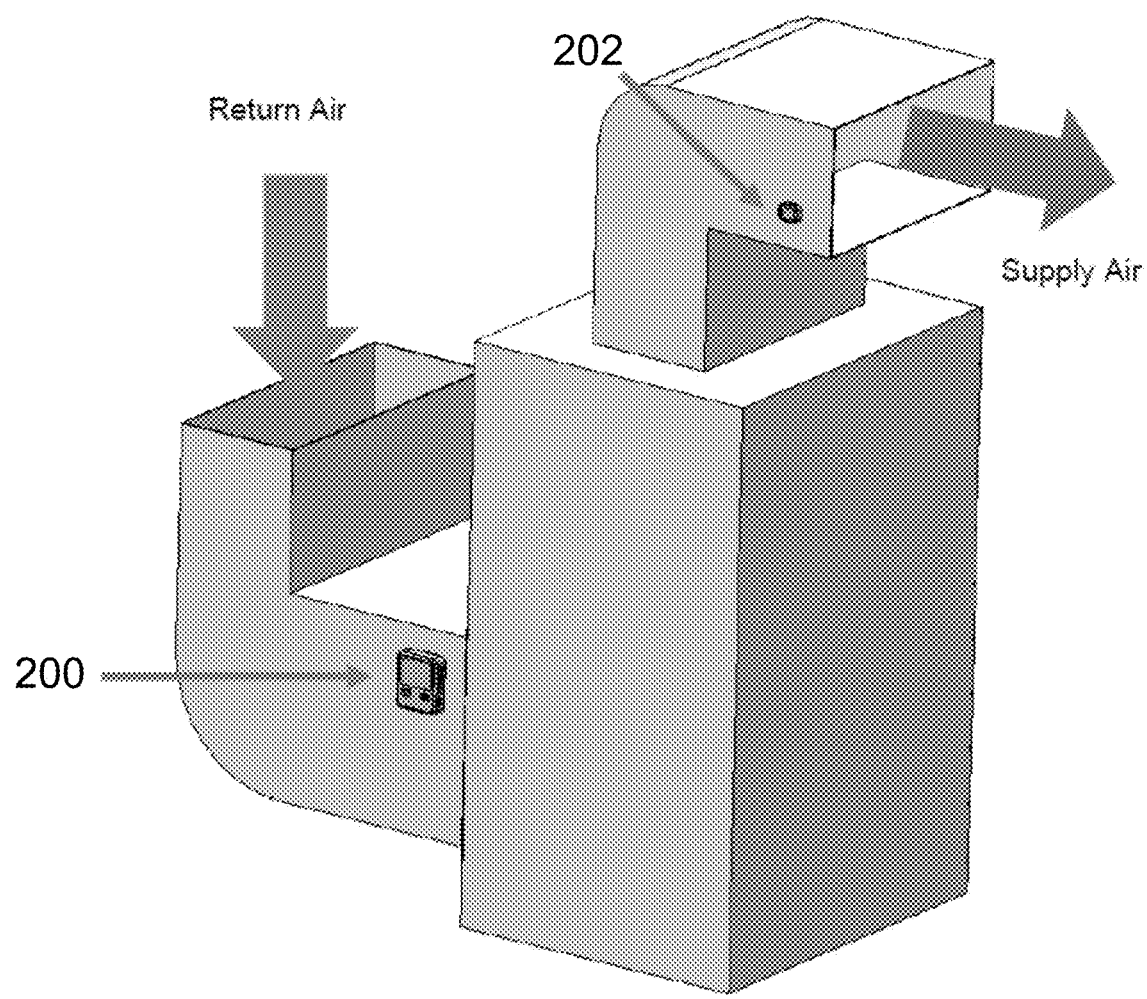
FIG. 14 illustrates a perspective view of an example two sensor arrangement, in accordance with an embodiment.

In an embodiment, as illustrated in FIG. 14, the air filter 100 can use a primary sensor to monitor the use of the air filter 100 and can provide guidance about the performance of the air filter and potentially when to change the air filter 100. The primary sensor 200 can be mounted on the filter with glue or by magnetic strip. In further cases, the primary sensor 200 can be mounted at any suitable point on the return side of the HVAC system 50. A secondary sensor 202 can be located in a separate location from the air filter 100 on the supply side of the HVAC system 50; such as on an air register 204 of the HVAC system 50. In some cases, the primary sensor 200 and the secondary sensor 202 can be temperature sensors. The primary sensor 200 and the secondary sensor 202 can be in communication with a controller 206, such as over a wired or wireless connection. The controller 206 can include a processing unit and data storage, the data storage comprising instructions for the one or more processors to execute a method 300 for determining performance of an air filter in an HVAC system, as described herein.

Figure 13:
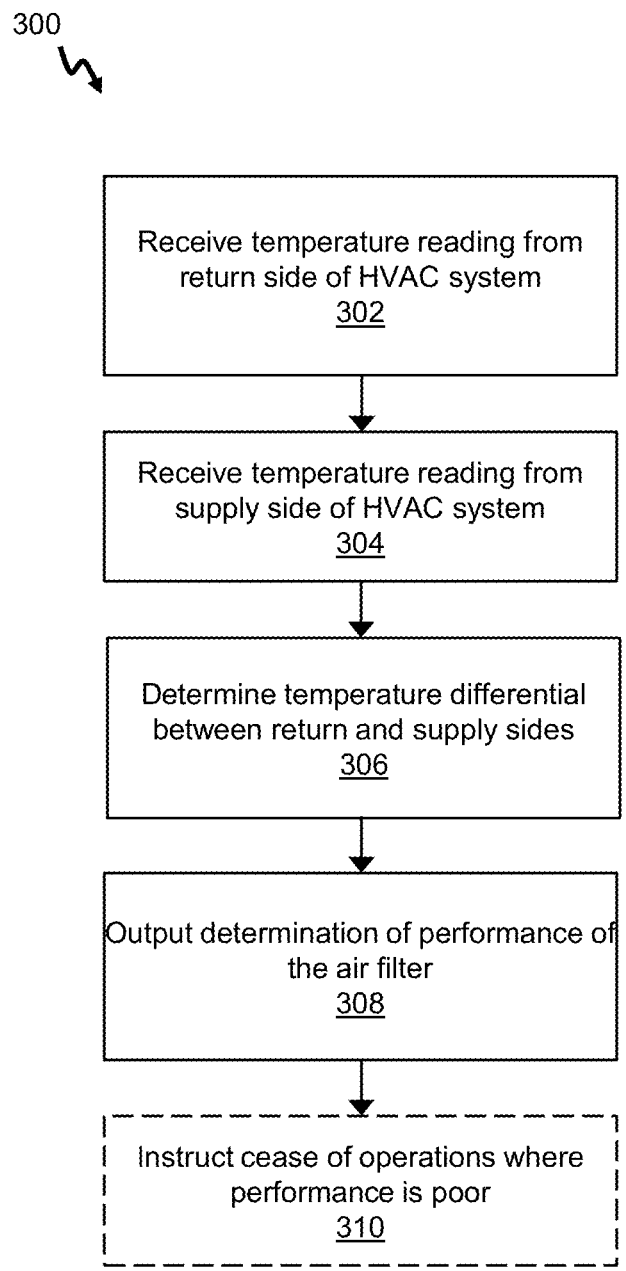
FIG. 13 illustrates the method for determining performance of an air filter in an HVAC system, in accordance with an embodiment.

FIG. 13 illustrates the method 300 for determining performance of an air filter in an HVAC system, in accordance with an embodiment. At block 302, the controller 206 receives a first temperature reading from the primary sensor 200 measuring the temperature of return air in the HVAC system. At block 304, the controller 206 receives a second temperature reading from the secondary sensor 202 measuring the temperature of supply air in the HVAC system. At block 306, the controller 206 determines a temperature differential between the first temperature and the second temperature. At block 308, the controller 206 outputs an indication of performance of the air filter; such as where the temperature difference is greater than a predetermined value, outputting an indication of poor performance. In some cases, at block 310, the controller 206 instructs the HVAC system to cease operation when the temperature difference is greater than the predetermined value.

With the method 300, the controller 206 can monitor temperature differentials between the primary sensor 200 and the secondary sensor 202, and where the temperature differential is greater than a predetermined difference (for example, a difference of greater than 0.5° C.), the controller 106 can output an indication that the air filter 100 has too much blockage and needs to be replaced. In this way, when there is a certain amount of temperature rise between the return side and the supply side of the HVAC system, the user can be alerted of the filters degrading condition. The indication can be a light, a digital display, or a communication to the HVAC system or to another electronic device, such as over Wi-Fi. In some cases, the controller 106 can provide a signal to the HVAC system 50 to cease operation due to blockage of the air filter 100.

In this way, the primary sensor 200 and the secondary sensor 202 measuring the return and supply temperatures, respectively, in order to accurately assess when to change the filter. When there is a certain amount of temperature rise, the controller 206 will alert a user of the filter's degrading condition. Once the filter is restricting the airflow too much, which will result in a sharp temperature rise, the filter change indication will be provided. If the filter is changed but the temperature differential problem still exists, then other parts of the furnace could be the cause and the user can conduct further investigation into the problem.

In some cases, the controller 206 can make difference determinations periodically throughout the day; for example, twenty-four times per day. In some cases, instead of only providing an indication that the filter needs to be changed, the controller 206 can estimate blockage of the filter using the measured temperature differential. In some cases, an initial calibration can be performed and stored in the controller to make the estimation of filter blockage (such as inserting filters with different blockages in the HVAC system and making measurements).

In some cases, the controller 206 and/or the thermostat of HVAC system 50 can receive input, and store, the type and size of air filter required by the HVAC system. In this way, the filter change indication can include the type and size of filter for replacement. In some cases, with the type and size of air filter information, upon determining a filter change is required, the controller can automatically communicate with an air filter retailer to order a replacement filter.

In some cases, the controller 206 can also store information with respect to when the filter was last changed. In this way, if the controller 206 makes a poor filter performance determination, based on the temperature differential, early in the life-cycle of the replaced air filter (for example, within one-month of use), the controller 206 can provide an indication to the user that other parts of the HVAC system may be not be functioning correctly.

Figure 16:
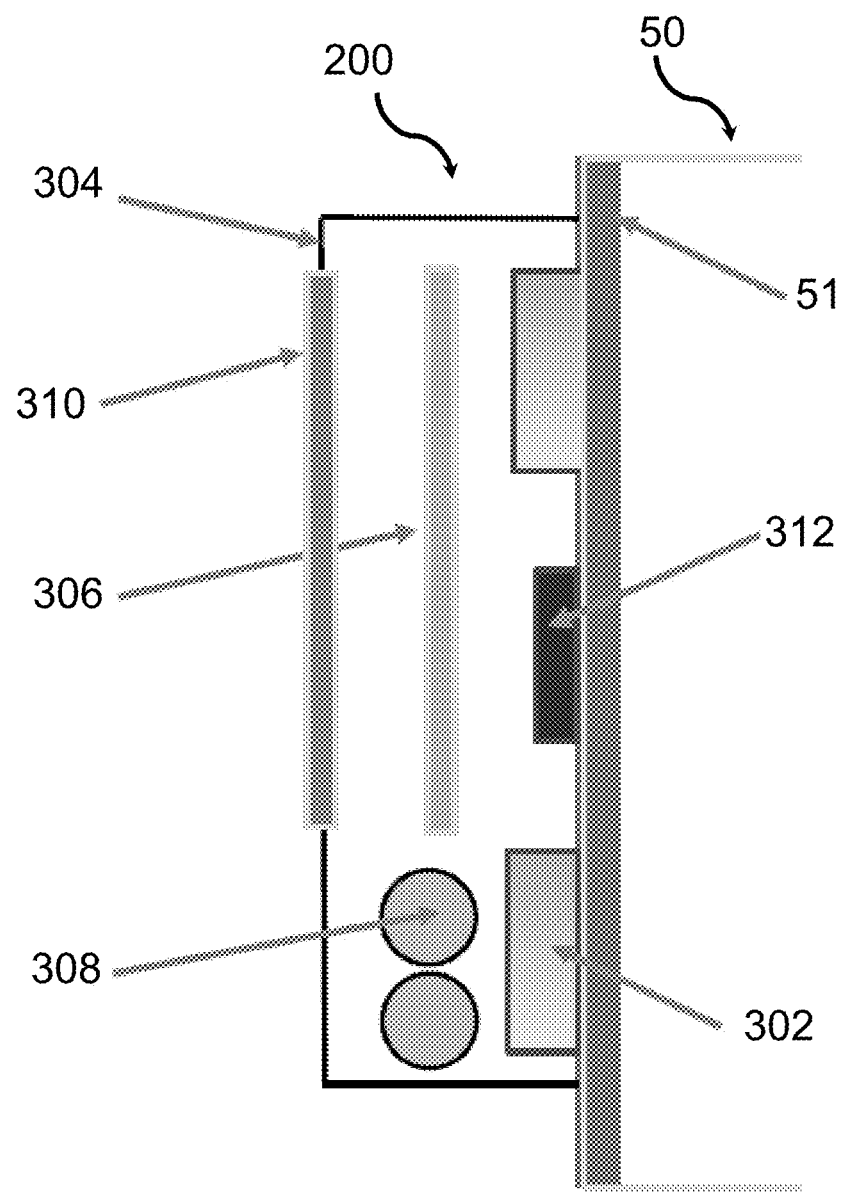
FIG. 16 illustrates a diagram of an example of a primary sensor.

In further cases, as illustrated in FIG. 14, the primary sensor 200 need not be located on the filter and can instead be located on the return air portion of the HVAC system 50; with the secondary sensor 202 located on the supply air portion of the HVAC system 50. In a particular example, as illustrated in FIG. 16, the primary sensor 200 can be attached to the supply side of the HVAC system 50. In this example, the primary sensor 200 includes magnets 302 inside a housing 304 to attach the primary sensor 200 to an exterior wall 51 of the HVAC system 50. Also inside the housing 304 can be a control board 306 and batteries 308, with a user display 310 located on an exterior wall of the housing 304. The control board can be used to perform the logic described herein and/or communicate with a thermostat and/or other parts of the HVAC system via Wi-Fi, Bluetooth, or the like. A temperature sensor 312, also located in the housing 304, on a side proximate the HVAC system 50, can be used to sense the temperature of the return side of the HVAC system 50.

Figure 15:
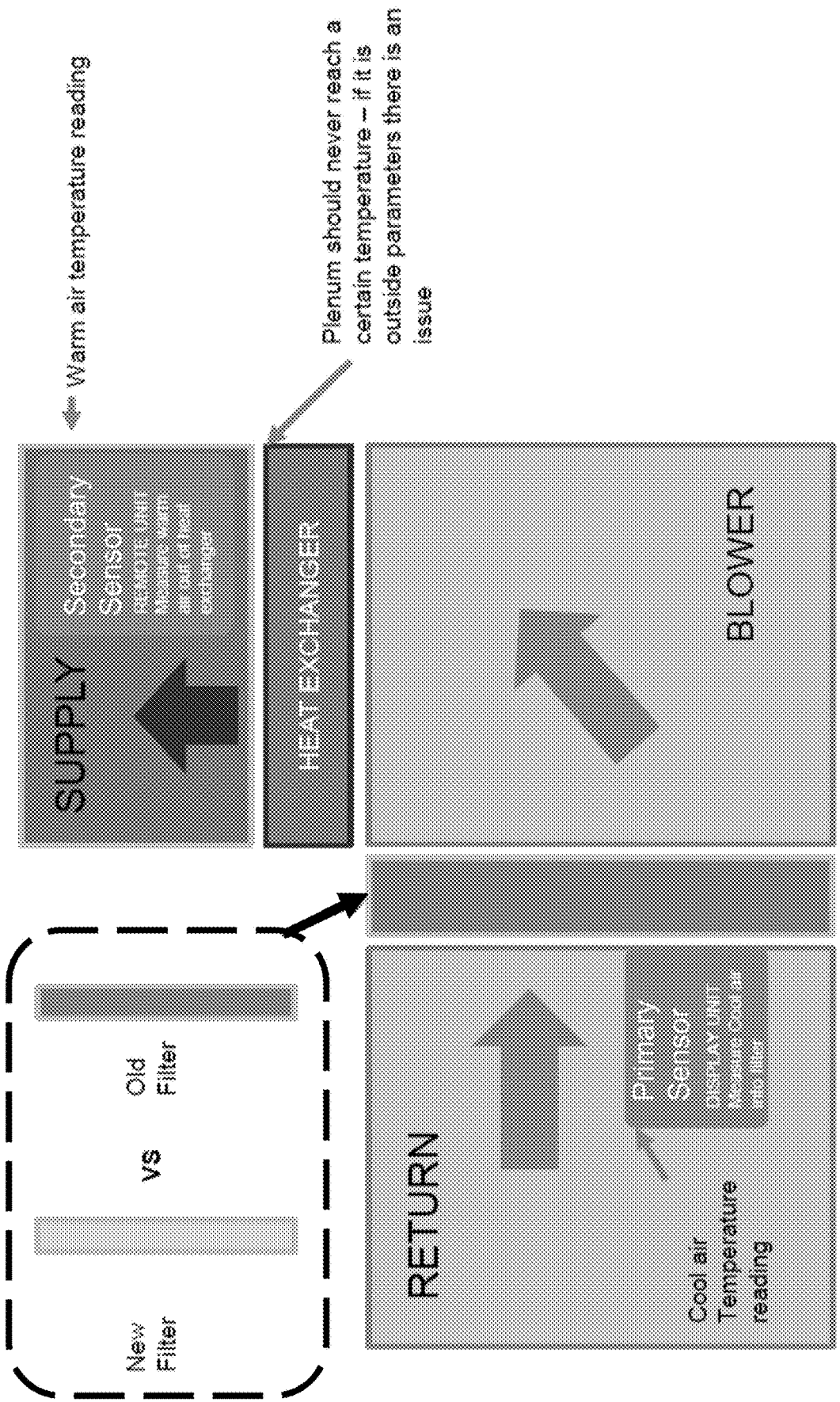
FIG. 15 is a diagram showing an example of a two sensor arrangement, in accordance with an embodiment.

FIG. 15 illustrates an exemplary diagram of air flow through the HVAC system 50 (during heating operation) with the primary sensor 200 and the secondary sensor 202 measuring the return and supply temperatures, respectively.

Figure 17:
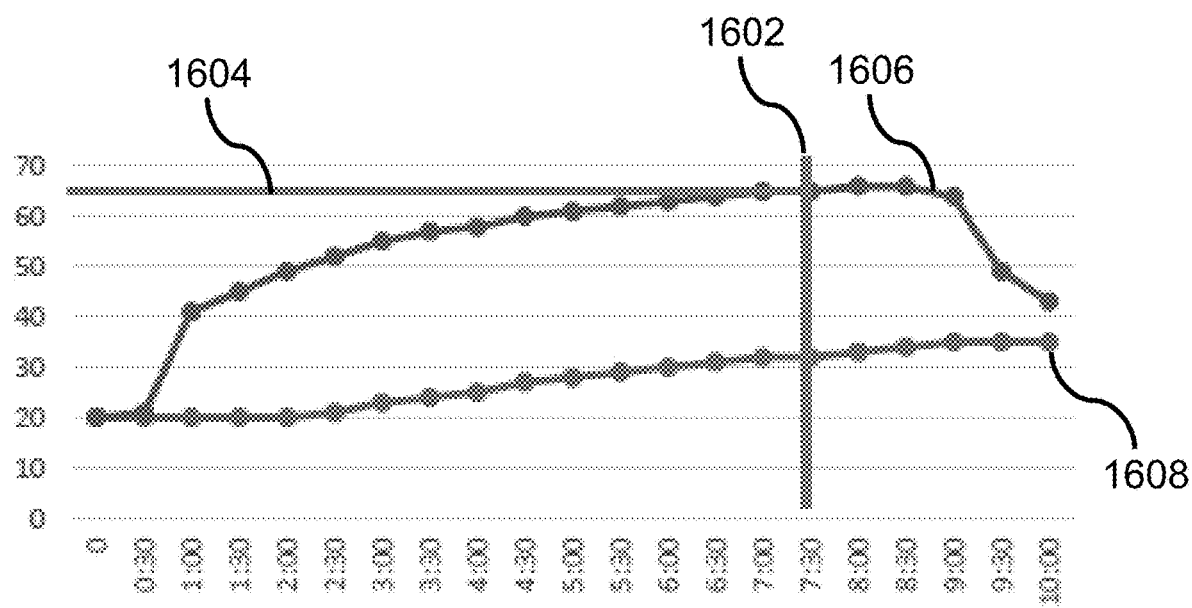
FIG. 17 is a chart showing normal operation of an air filter in an HVAC system.
Figure 18:
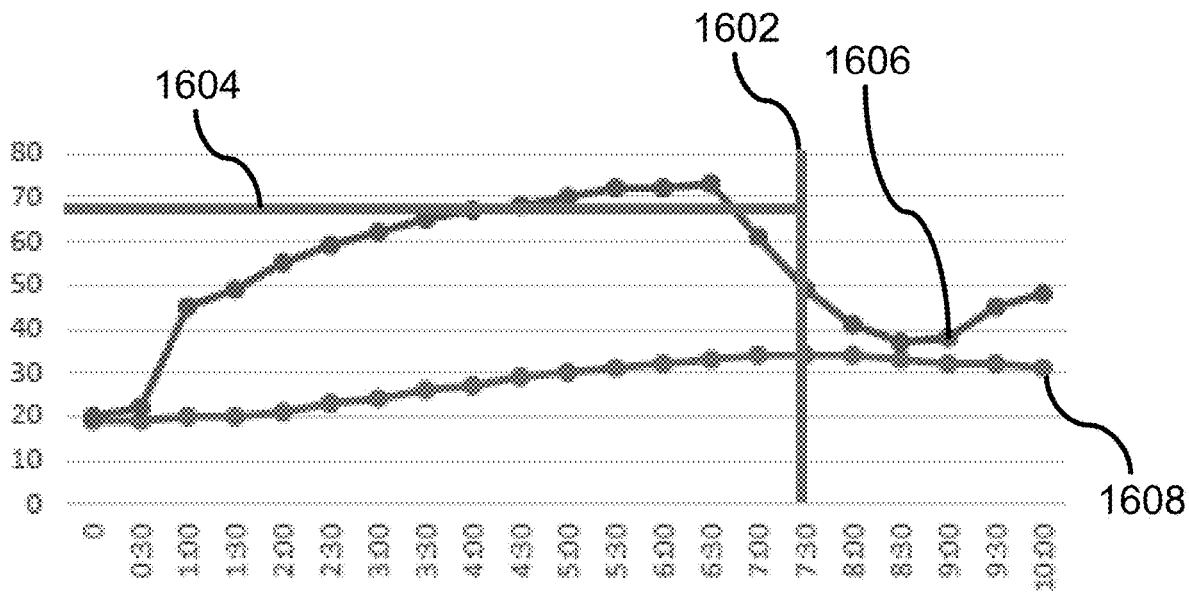
FIG. 18 is a chart showing operation of an air filter with approximately 50% blockage in an HVAC system.
Figure 19:
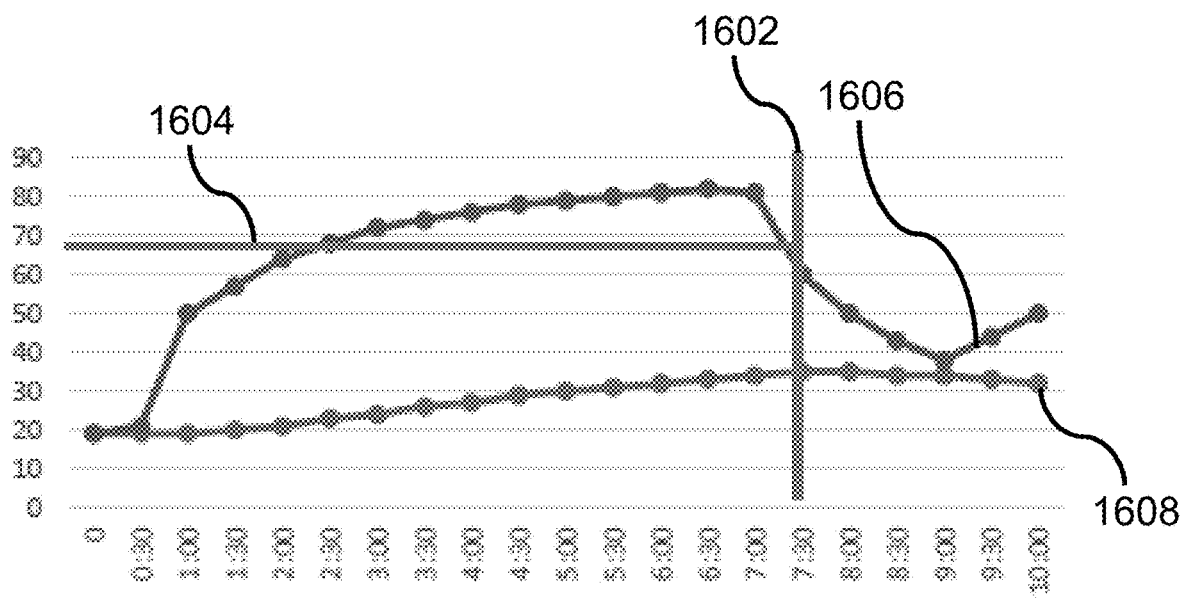
FIG. 19 is a chart showing operation of an air filter with approximately 80% blockage in an HVAC system.

FIGS. 17 to 19 are charts that show example experiments that illustrate the functioning of the method 300. FIG. 17 illustrates normal operation of an HVAC system, working in heating/furnace operation, with a relatively clean air filter. Shown at 1602 and 1604 is a baseline reference for time and temperature intersection at 65° C. and 7.5 minutes into furnace cycle. The first trend line 1606 shows furnace internal temperature measured above a heat source after air has traveled through air filter and plenum. The second trend line 1608 shows a measure of ambient room temperature. FIG. 18 illustrates operation of the HVAC system with an air filter that has approximately 50% blockage. As shown, as the air filter gets used, it gets clogged up and the efficiency of the air filter begins to change the temperature differential. In some cases, the controller 206 can measures this drop in filter efficiency and provide an indication that the filter has some debris. FIG. 19 illustrates operation of the HVAC system with an air filter that has approximately 80% blockage. As shown, when the filter gets very clogged, there is a noticeable drop in efficiency of how hot air is moved through the HVAC system. In some cases, the controller 206 can measure this substantial drop in filter efficiency and provide an indication that the filter needs change.

In further cases, instead of, or in addition to, determining a temperature differential, an air pressure sensor can be used as the primary sensor 200 to estimate how much air is passing through the filter 100. The secondary sensor 202 may not be necessary in this embodiment. In this way, the primary sensor 200 can be used by the controller 106 to make a determination of the performance of the air filter 100; where air flow determined to be below a predetermined value is an indication of poor performance.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. An air filter for use in a heating, ventilation, and air conditioning (HVAC) system, the air filter comprising:
a front portion comprising a molded filtering material;
a rear portion joined to the front portion, the rear portion defining a plurality of holes therethrough and a slot on an outside edge of the rear portion; and
a compressible gasket positioned at least partially within the slot defined by the rear portion.

2. The air filter of claim 1, further comprising secondary filters sandwiched between the front portion and the rear portion.

3. An HVAC system comprising the air filter of claim 1.

4. The air filter of claim 1, wherein the slot is defined along the entire perimeter formed by the outside edges of the rear portion.

5. The air filter of claim 1, wherein the compressible gasket is dimensioned to form a seal with a filter housing in the HVAC system.

6. The air filter of claim 1, wherein the plurality of holes defined by the rear portion are polygonal shaped.

7. The air filter of claim 6, wherein the polygonal shaped holes defined by the rear portion are hexagonal shaped.

* * * * *